US012780658B2

(12) United States Patent
Takata et al.

(10) Patent No.: US 12,780,658 B2
(45) Date of Patent: Nov. 3, 2026

(54) HYDROGEN SEPARATION FILTER

(71) Applicant: TOYOTA JIDOSHA KABUSHIKI KAISHA, Toyota (JP)

(72) Inventors: Satoshi Takata, Toyota (JP); Tomonari Kogure, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 297 days.

(21) Appl. No.: 18/624,388

(22) Filed: Apr. 2, 2024

(65) Prior Publication Data

US 2024/0359978 A1 Oct. 31, 2024

(30) Foreign Application Priority Data

Apr. 28, 2023 (JP) ................................ 2023-074869

(51) Int. Cl.

| | |
|---|---|
| ***C01B 3/501*** | (2026.01) |
| ***C01B 3/503*** | (2026.01) |
| ***C01B 3/505*** | (2026.01) |

(52) U.S. Cl.

CPC .............. *C01B 3/505* (2013.01); *C01B 3/501* (2013.01); *C01B 3/503* (2013.01)

(58) Field of Classification Search

CPC .......... C01B 3/505; C01B 3/503; C01B 3/501

See application file for complete search history.

(56) References Cited

U.S. PATENT DOCUMENTS

| | | | | |
|---|---|---|---|---|
| 6,899,744 | B2 * | 5/2005 | Mundschau | B01D 53/228 95/55 |
| 8,608,829 | B1 * | 12/2013 | Dogan | C01B 3/505 95/56 |
| 12,371,321 | B2 * | 7/2025 | Takata | B01D 71/022 |
| 12,508,538 | B2 * | 12/2025 | Takata | B01D 53/228 |
| 2007/0240566 | A1 * | 10/2007 | Benn | B01D 71/0223 502/4 |
| 2023/0212008 | A1 | 7/2023 | Takata et al. | |

FOREIGN PATENT DOCUMENTS

| | | | |
|---|---|---|---|
| JP | 2005-279536 | A | 10/2005 |
| JP | 2021-109146 | A | 8/2021 |
| JP | 2023-075887 | A | 5/2023 |

OTHER PUBLICATIONS

Jan. 6, 2026 Office Action issued in Japanese Patent Application No. 2023-074869.

Aoki, Yuki., "Pd—Ag superlattice nanothin film necessary for hydrogen recovery from steel by-product gas." 2014 Technical research report, JFE 21st Century Foundation, 2014, pp. 175-180.

* cited by examiner

*Primary Examiner* — Charles G Freay

(74) *Attorney, Agent, or Firm* — Oliff PLC

(57) ABSTRACT

Provided is a hydrogen separation filter having higher hydrogen selectivity. The hydrogen separation filter includes a foil of a first metal, a lattice expansion layer formed on the foil and consisting of a second metal, and a hydrogen dissociation layer formed on the lattice expansion layer and consisting of a third metal. The first metal is selected from the group consisting of Pd, V, Ta, Nb, and alloys thereof.

5 Claims, 1 Drawing Sheet

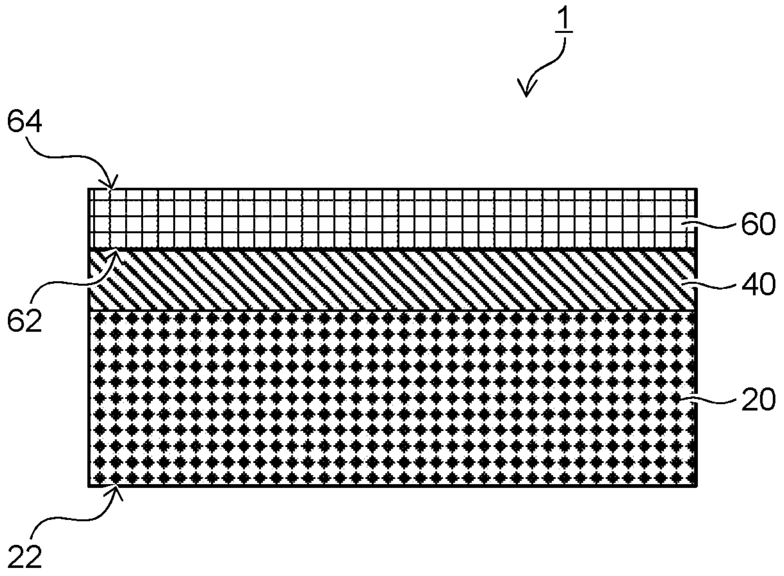
1
64
60
40
62
20
22

HYDROGEN SEPARATION FILTER

CROSS REFERENCE TO RELATED APPLICATIONS

The present application claims priority from Japanese patent application JP 2023-074869 filed on Apr. 28, 2023, the entire content of which is hereby incorporated by reference into this application.

BACKGROUND

Technical Field

The present disclosure relates to a hydrogen separation filter.

Background Art

As a hydrogen purification method, there has been known a membrane separation method using a metal film. JP 2021-109146 A discloses a hydrogen separation membrane obtained by forming palladium silver films on both surfaces of a pure palladium plate by sputtering.

SUMMARY

Hydrogen separation membranes with higher hydrogen selectivity are desired. The present disclosure provides a hydrogen separation filter having higher hydrogen selectivity.

Aspects of the present disclosure include the followings.

1. A hydrogen separation filter comprising:
   - a foil of a first metal;
   - a lattice expansion layer formed on the foil and consisting of a second metal; and
   - a hydrogen dissociation layer formed on the lattice expansion layer and consisting of a third metal,
   - wherein the first metal is selected from the group consisting of Pd, V, Ta, Nb, and alloys thereof, and
   - the second metal is selected from the group consisting of Ag, Au, Al, Pt, and alloys thereof, and the third metal is Pd, or
   - the second metal is selected from the group consisting of Nb, W, Mo, and alloys thereof, and the third metal is V, or
   - the second metal is selected from the group consisting of Nb, W, Mo, V, and alloys thereof, and the third metal is Ta, or
   - the second metal is selected from the group consisting of Mg, Y, Zr, Cd, Gd, Tb, Dy, Ho, Er, Hf, Sc, and alloys thereof, and the third metal is Ti, or
   - the second metal is selected from the group consisting of Eu, Li, Na, K, Rb, Cs, Ba, and alloys thereof, and the third metal is Nb.
2. The hydrogen separation filter according to aspect 1, wherein the first metal is V.
3. The hydrogen separation filter according to aspect 1 or 2, wherein the third metal is Pd.
4. The hydrogen separation filter according to any one of aspects 1 to 3, wherein the second metal is Ag.
5. The hydrogen separation filter according to any one of aspects 1 to 4, wherein a lattice constant $a_{3b}$ of a bulk metal having a same composition and a same crystalline structure as the third metal and a lattice constant $a_3$ of the third metal in the hydrogen dissociation layer determined from a plane spacing of crystallographic planes perpendicular to an interface between the lattice expansion layer and the hydrogen dissociation layer satisfy Formula (1) below:

$$a_{3b} < a_3. \quad (1)$$

The hydrogen separation filter of the present disclosure has high hydrogen selectivity.

BRIEF DESCRIPTION OF THE DRAWINGS

FIG. 1 is a schematic cross-sectional view of a hydrogen separation filter according to an embodiment.

DETAILED DESCRIPTION

The following describes embodiments with reference to the drawing as appropriate. In the drawing referred in the following description, the same reference numerals may be used for the same members or the members having similar functions, and their repeated explanations may be omitted in some cases. For convenience of explanation, dimensional ratios and shapes of members in the drawing are exaggerated, and may differ from actual dimensional ratios and shapes. A numerical range expressed herein using the term "to" includes respective values described before and after the term "to" as the lower limit value and the upper limit value. The upper limit value and the lower limit value of the numerical range disclosed herein can be used singly or in any combination.

The terms "comprise", "include" and "contain" herein mean that additional components may be included, and encompass "consisting of" and "consisting essentially of." The term "consisting essentially of" means that an additional component having substantially no adverse effect may be included. While the term "consisting of" means including only the described material, but does not exclude inclusion of inevitable impurities.

The term "perpendicular" herein not only means to be accurately perpendicular, but encompasses being approximately perpendicular, and the term "parallel" not only means to be accurately parallel, but encompasses being approximately parallel. The term "on" herein encompasses both of "directly on" and "indirectly on" insofar as it is not especially specified in the context.

A hydrogen separation filter 1 according to the embodiment illustrated in FIG. 1 includes a foil 20, a lattice expansion layer 40 formed on the foil 20, and a hydrogen dissociated layer 60 formed on the lattice expansion layer 40.

The hydrogen separation filter 1 illustrated in FIG. 1 selectively separates hydrogen as follows. Hydrogen molecules are dissociatively adsorbed on a surface 64 of the hydrogen dissociation layer 60 to form hydrogen atoms. The hydrogen atoms diffuse through the hydrogen dissociation layer 60, the lattice expansion layer 40, and the foil 20. Hydrogen atoms recombine on a surface 22 of the foil 20 to form molecular hydrogen and leave the hydrogen separation filter 1. Thus, the hydrogen separation filter 1 selectively separates hydrogen.

The foil 20 is a foil of a first metal. The first metal is a metal in which hydrogen can diffuse. Specifically, the first metal is selected from the group consisting of Pd, V, Ta, Nb, and alloys thereof. In particular, the first metal may be V. V is inexpensive and has a large hydrogen diffusion coefficient.

The lattice expansion layer 40 consists of a second metal. The hydrogen dissociation layer 60 consists of a third metal.

The third metal is selected from the group consisting of Pd, V, Ta, Ti, and Nb. In particular, the third metal may be Pd. Pd has particularly good hydrogen dissociation performance.

The second metal has the same crystal structure as the third metal. The second metal in the lattice expansion layer 40 may also have the same crystallographic orientation as the third metal in the hydrogen dissociation layer 60.

A bulk metal having the same composition and the same crystalline structure as the second metal (hereinafter, appropriately referred to as "second bulk metal") has a lattice constant $a_{2b}$. A bulk metal having the same composition and the same crystalline structure as the third metal (hereinafter, appropriately referred to as "third bulk metal") has a lattice constant $a_{3b}$. The lattice constant $a_{2b}$ and the lattice constant $a_{3b}$ may satisfy Equation (2) below:

$$1.03a_{3b} \leq a_{2b} \leq 1.15a_{3b}. \tag{2}$$

When the second metal and the third metal have crystal structures other than the cubic crystal structure, the lattice constants along the same crystal axes of the second bulk metal and the third bulk metal may satisfy Equation (2). Here, the bulk metal means a metal that is completely relaxed and free-standing (i.e. not supported by another member). When the second metal and the third metal have the same crystal structure and have compositions satisfying Formula (2), the lattice constant $a_3$ of the third metal in the hydrogen dissociation layer 60 can be made larger than the lattice constant $a_{3b}$ of the third bulk metal.

For example, when the third metal is Pd having a face-centered cubic lattice (fcc) structure, the second metal may be selected from the group consisting of fcc structured Ag, Al, Au, Pt, and alloys thereof. Particularly, the second metal may be Ag, which is relatively inexpensive and chemically stable. When the third metal is V having a body-centered cubic lattice (bcc) structure, the second metal may be selected from the group consisting of bcc structured Nb, W, Mo, and alloys thereof. When the third metal is Ta having a bcc structure, the second metal may be selected from the group consisting of bcc structured Nb, W, Mo, V, and alloys thereof. When the third metal is Ti having a hcp structure, the second metal may be selected from the group consisting of hcp structured Mg, Y, Zr, Cd, Gd, Tb, Dy, Ho, Er, Hf, Sc, and alloys thereof. When the third metal is Nb having a bcc structure, the second metal may be selected from the group consisting of bcc structured Eu, Li, Na, K, Rb, Cs, Ba, and alloys thereof. The lattice constants of these metals in relaxed states are shown in Table 1.

TABLE 1

| Metal | Crystal Structure | Lattice Constant [nm] | Metal | Crystal Structure | Lattice Constant [nm] |
|---|---|---|---|---|---|
| Pd | fcc | 0.38898 | Au | fcc | 0.40786 |
| Pt | fcc | 0.39231 | Ag | fcc | 0.40862 |
| Al | fcc | 0.40496 | Ta | bcc | 0.28665 |
| V | bcc | 0.30300 | Mg | hcp | a 0.32094 |
| Mo | bcc | 0.31399 | | | c 0.52103 |
| W | bcc | 0.31560 | Y | hcp | a 0.3647 |
| Nb | bcc | 0.32941 | | | c 0.5731 |
| Li | bcc | 0.3509 | Zr | hcp | a 0.3232 |

TABLE 1-continued

| Metal | Crystal Structure | Lattice Constant [nm] | Metal | Crystal Structure | Lattice Constant [nm] |
|---|---|---|---|---|---|
| Eu | bcc | 0.4606 | | | c 0.5147 |
| Na | bcc | 0.4291 | Cd | hcp | a 0.29793 |
| K | bcc | 0.5247 | | | c 0.56181 |
| Rb | bcc | 0.5605 | Gd | hcp | a 0.36315 |
| Cs | bcc | 0.6067 | | | c 0.5777 |
| Ba | bcc | 0.5025 | Tb | hcp | a 0.3590 |
| Ti | hcp | a 0.29503 | | | c 0.5696 |
| | | c 0.46831 | Dy | hcp | a 0.35923 |
| | | | | | c 0.56543 |
| | | | Ho | hcp | a 0.35761 |
| | | | | | c 0.5617 |
| | | | Er | hcp | a 0.3559 |
| | | | | | c 0.5587 |
| | | | Hf | hcp | a 0.3320 |
| | | | | | c 0.5460 |
| | | | Sc | hcp | a 0.3309 |
| | | | | | c 0.5273 |

The lattice constant $a_3$ of the third metal in the hydrogen dissociation layer 60 may satisfy Equation (1) below:

$$a_{3b} < a_3. \tag{1}$$

The lattice constant $a_3$ of the third metal may satisfy Equation (3) below:

$$1.01a_{3b} \leq a_3 \leq 1.05a_{3b}. \tag{3}$$

The lattice constant $a_3$ of the third metal may satisfy Equation (4) below:

$$1.02a_{3b} \leq a_3 \leq 1.03a_{3b}. \tag{4}$$

Here, the lattice constant $a_3$ of the third metal is determined from a plane spacing of crystallographic planes perpendicular to an interface 62 between the lattice expansion layer 40 and the hydrogen dissociation layer 60. Specifically, a transmission electron microscopy (TEM) is used to obtain an electron diffraction pattern of the third metal. Next, based on the electron diffraction pattern, the plane spacing of the crystallographic planes perpendicular to the interface 62 between the lattice expansion layer 40 and the hydrogen dissociation layer 60 is determined. Finally, the plane spacing is used to determine the lattice constant $a_3$ of the third metal. Equation (1) above shows that the crystal lattice of the third metal in the hydrogen dissociation layer 60 expands at least in a direction parallel to the interface 62 compared with that in fully relaxed state. The crystal lattice of the third metal in the hydrogen dissociation layer 60 may also expand in a direction perpendicular to the interface 62. The expansion of the crystal lattice in the hydrogen dissociation layer 60 increases the hydrogen diffusion coefficient in the hydrogen dissociation layer 60. Consequently, the hydrogen separation filter 1 can have a higher hydrogen selectivity. For example, when the third metal is Pd, expansion of Pd lattice changes the hydrogen diffusion path from octahedral sites to tetrahedral sites. This makes it easier for hydrogen to diffuse due to the nuclear quantum effect.

An exemplified method for manufacturing the hydrogen separation filter 1 according to the embodiment will be described. First, a surface of the foil 20 is cleaned by ion etching. Next, the second metal is deposited on the foil 20 by a sputtering method to form the lattice expansion layer 40. The third metal is then deposited on the lattice expansion layer 40 to form the hydrogen dissociation layer 60. Thus, the hydrogen separation filter 1 according to the embodiment is obtained.

The present disclosure is not limited to the above-described embodiments, and various design changes can be made without departing from the spirit of the present disclosure described in the claims.

EXAMPLES

While the following specifically describes the present disclosure by examples, the present disclosure is not limited to these examples.

(1) Production of Hydrogen Separation Filter

Example 1

A vanadium foil (V foil) having a thickness of 0.1 mm was placed in a deposition chamber of a sputtering device with a pure Ag target and a pure Pd target. A surface of the V foil was cleaned by Ar ion etching. An Ag layer was formed on the V foil by sputtering. Next, a Pd layer was formed on the Ag layer by sputtering. Thus, the hydrogen separation filter (hereinafter, simply referred to as the "filter") was produced.

Comparative Example 1

A V foil having a thickness of 0.1 mm was placed in a deposition chamber of a sputtering device with an AgPd alloy target. A surface of the V foil was cleaned by Ar ion etching. An AgPd alloy layer was formed on the V foil by sputtering. Thus, the filter was produced.

(2) Measuring Lattice Constant

A TEM was used for obtaining an electron diffraction pattern of the Pd layer of the filter of Example 1. Based on the electron diffraction pattern, a plane spacing of crystallographic planes perpendicular to an interface between the Pd layer and the Ag layer was determined. The lattice spacing was used for calculating a lattice constant of the Pd layer. The lattice constant $a_{pd}$ was about 1.026 times as large as the lattice constant $a_{pdb}$ (0.38898 nm) of fully relaxed Pd.

(3) Evaluation of Hydrogen Separation Performance

In compliance with JIS K7126: 2006 (Plastics—Film and sheeting-Determination of gas-transmission rate—Part 1: Differential-pressure method), hydrogen gas transmission rates and nitrogen gas transmission rates (unit: $mol \cdot m^{-2} \cdot s^{-1} \cdot Pa^{-1}$) of the filters of Example 1 and Comparative Example 1 were measured by a gas chromatography method. A ratio of the hydrogen gas transmission rate to the nitrogen gas transmission rate of the filter (i.e., hydrogen gas transmission rate/nitrogen gas transmission rate, hereinafter, simply referred to as "transmission rate ratio") of Example 1 was 12 times as large as a transmission rate ratio of the filter of Comparative Example 1. It was shown that the filter of Example 1 was able to separate hydrogen with significantly higher selectivity compared with the filter of Comparative Example 1.

What is claimed is:

1. A hydrogen separation filter comprising:

a foil of a first metal;

a lattice expansion layer formed on the foil and consisting of a second metal; and a hydrogen dissociation layer formed directly on the lattice expansion layer and consisting of a third metal, wherein the first metal is selected from the group consisting of Pd, V, Ta, Nb, and alloys thereof, and the second metal is selected from the group consisting of Ag, Au, Al, Pt, and alloys thereof, and the third metal is Pd, or the second metal is selected from the group consisting of Nb, W, Mo, and alloys thereof, and the third metal is V, or the second metal is selected from the group consisting of Nb, W, Mo, V, and alloys thereof, and the third metal is Ta, or the second metal is selected from the group consisting of Mg, Y, Zr, Cd, Gd, Tb, Dy, Ho, Er, Hf, Sc, and alloys thereof, and the third metal is Ti, or the second metal is selected from the group consisting of Eu, Li, Na, K, Rb, Cs, Ba, and alloys thereof, and the third metal is Nb.

2. The hydrogen separation filter according to claim 1, wherein the first metal is V.

3. The hydrogen separation filter according to claim 1, wherein the third metal is Pd.

4. The hydrogen separation filter according to claim 1, wherein the second metal is Ag.

5. The hydrogen separation filter according to claim 1, wherein a lattice constant $a_{3b}$ of a bulk metal having a same composition and a same crystalline structure as the third metal and a lattice constant $a_3$ of the third metal in the hydrogen dissociation layer determined from a plane spacing of crystallographic planes perpendicular to an interface between the lattice expansion layer and the hydrogen dissociation layer satisfy Formula (1) below:

$$a_{3b} < a_3. \quad (1)$$

* * * * *